March 5, 1963  A. G. BADE  3,079,804
VARIABLE SPEED DRIVE

Filed Oct. 25, 1960  3 Sheets-Sheet 1

INVENTOR
ALFRED G. BADE

BY
*Arnold J. Eriesen*

ATTORNEY

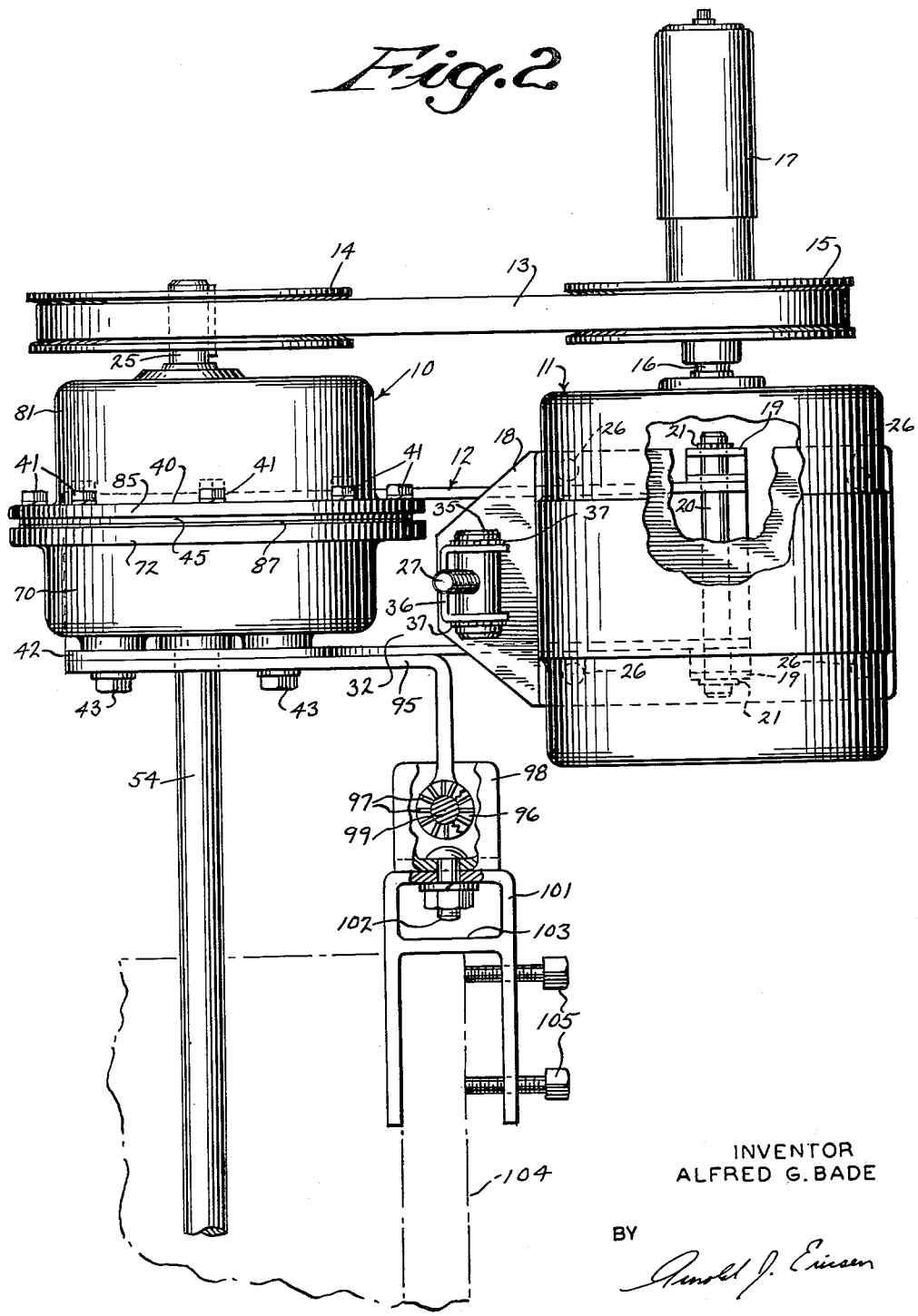

March 5, 1963  A. G. BADE  3,079,804
VARIABLE SPEED DRIVE
Filed Oct. 25, 1960  3 Sheets-Sheet 3
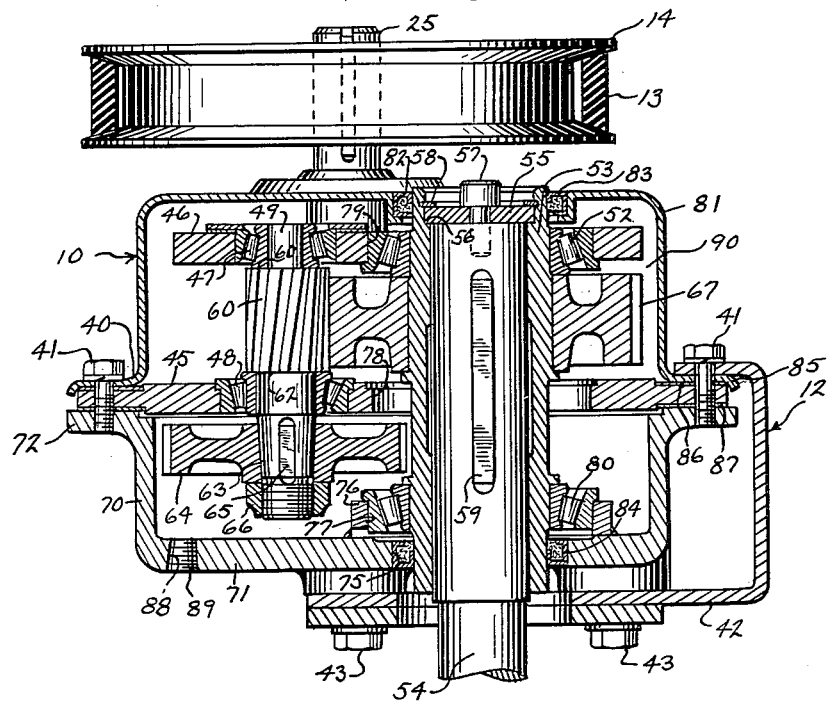
INVENTOR
ALFRED G. BADE
BY
Arnold J. Ericsen
ATTORNEY

United States Patent Office 3,079,804
Patented Mar. 5, 1963

3,079,804
VARIABLE SPEED DRIVE
Alfred G. Bade, Brookfield, Wis., assignor to The Falk Corporation, Milwaukee, Wis., a corporation of Wisconsin
Filed Oct. 25, 1960, Ser. No. 64,912
4 Claims. (Cl. 74—230.17)

The present invention relates to machinery and other drive mechanisms and in particular to drives wherein a motor unit and a reducer unit are disposed in driving relationship relative to one another.

The invention has among its objects the provision of a motor and reducer unit mounted on a common support member, and wherein the shaft centers of the respective units may be adjustably varied for repositioning a drive connection, such as a V-belt in a variable cone pulley, to vary the drive ratio between the units, and wherein the reducer unit housing preferably includes a peripheral flange providing means for varying the relative mounting position of the units as an aid in varying the head room or other physical spacing requirements to suit a variety of restricting conditions.

It is a particular object of the present invention to provide a combination motor and reducer mounted on a common support member in hinged connection with one another, and wherein there is provided a manually operated, threaded adjustment shaft for providing pivotal adjustment between the motor and reducer to thereby vary the drive connection centers for selectively changing the drive ratio therebetween.

It is another object of the present invention to provide a motor and reducer unit combination supported from a common support member and wherein the said common support member may be attached to a clamping bracket for removably mounting the combination and wherein there is provided a counterbalanced arrangement of parts relative to said clamping bracket.

It is still another object of the present invention to provide a portable motor-reducer unit for use in driving agitator shafts or the like, and wherein the motor and reducer units are arranged to substantially counterbalance their respective moment arms measured from the position of mounting of the unit on a reactor or the like wherein the agitator shaft is to be used.

It is another object of the present invention to provide a motor and reducer unit combination particularly adapted for portable application wherein the output shaft of the reducer unit is in the form of a hollow quill providing a self-contained bearing support for an agitator shaft with provision for ready replacement of the shaft, and wherein the reducer unit of said combination is provided with a board bearing span for journalling the output shaft to thereby provide added strength for use in counterbalance mounting upon a common support member.

It is a specific object of the present invention to provide a motor-reducer unit wherein the motor and reducer are supported from a common support member and wherein the reducer is driven by means of a pulley and belt drive and the motor is pivotally mounted on the common support member with a manual adjusting screw disposed to rock the motor on its pivot support for varying the distance between the motor shaft center and the input shaft center of the reducer and whereby at least one of the pulleys for the belt is of a variable cone type having a spring biasing means for normally urging the cones towards one another, the separation of said pulley cones being controlled by manual adjustment of the screw to regulate the belt tension to provide variations in the drive ratio between the reducer and motor units.

Still another specific object of the present invention is to provide a motor unit and reducer unit supported from a common support means, and wherein the reducer unit includes an arcuate flange upon which the support means may be mounted in several positions circumferentially of the flange to vary the relative mounting positions for universal application to any desired head space or mounting area.

The invention further consists in the several features hereinafter described and more particularly defined by the appended claims.

In the drawings:
FIG. 1 is a top plan view of the variable speed mechanism, wherein the motor unit is illustrated in two operating positions relative to the common support member, and further, wherein the common support member is illustrated in two mounting positions relative to the periphery of a reducer unit;

FIG. 2 is a side elevational view of the motor and reducer unit, shown as used in a portable manner fastened in place upon a reactor vessel for driving an agitator shaft therein;

FIG. 3 is a sectional view taken along line 3—3 of FIG. 1;

FIG. 4 is a sectional view taken along line 4—4 of FIG. 1 and illustrating the manual adjusting means; and FIG. 5 is a fragmentary sectional view illustrating a portion of the gearing within the reducer unit shown in FIGS. 1, 2 and 3.

Figure 1:
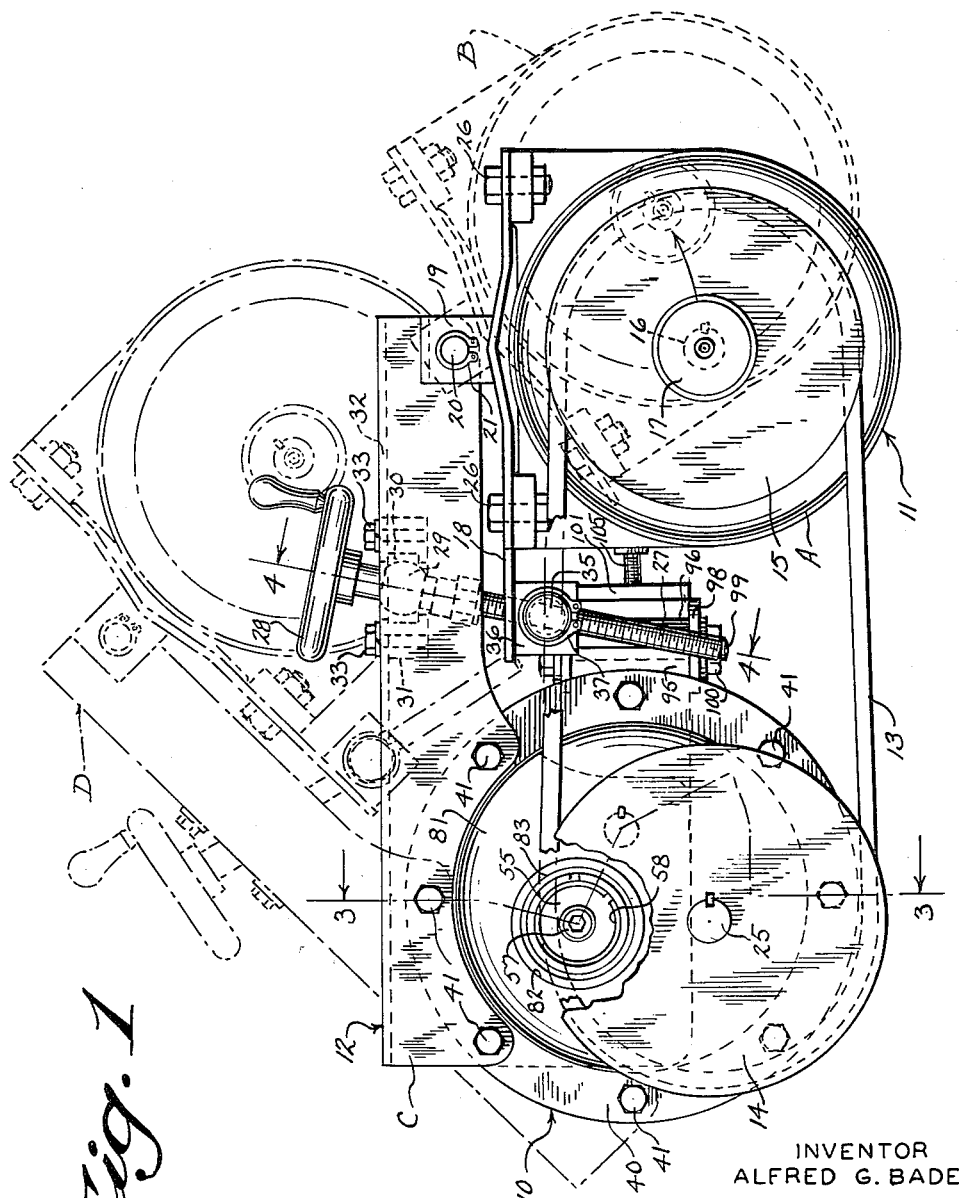

Referring to the drawings, the variable drive mechanism comprises three basic units including a reducer, a motor and a common support member respectively designated by the reference numerals 10, 11 and 12. The motor and reducer are provided with a drive connection preferably in the form of a V-belt 13 encircling a conventional pulley 14 on the reducer 10 and a pulley 15 mounted on the shaft 16 of the motor 11. The pulley 15 is of the V-belt type and carries the V-belt 13 and may be adjusted to variable speeds by a spring encased in a housing 17 which adjusts the pulley and changes the drive ratio automatically as the angle of the motor is varied with respect to the support member 12, as will be hereinafter described. It will be apparent that the pulleys may be reversed without departing from the scope of the present invention.

In order to provide the variable adjustment, the motor is preferably mounted on a pad or bracket 18 which is pivotally mounted on the common support member 12. The member 12 preferably takes the form of an elongated U-shaped channel, and the bracket 18 is essentially a stamped and formed plate including spaced apart, upstanding hinge supports 19 arranged to receive a pivot pin 20 seated in an opening in the channel member 12. Locking means such as the C-type washers 21 are arranged to engage annular grooves in the pivot pin 20 for preventing axial displacement of the bracket relative to the support member 12.

It will thus be apparent that the motor may be rocked on the pivot point as illustrated by the bold line position A of FIG. 1 and the phantom line position B of FIG. 1. Thus, rocking movement of the motor 11 on its supporting pivot will vary the tension of the belt 13 and cause a change in speed to the input shaft 25 of the reducer 10, inasmuch as the coned flanges of the variable pulley 15 are movable relative to one another. The motor is mounted on the bracket 18 in a conventional manner by means of the nut and bolt assemblies 26.

The manual adjusting means for varying the drive ratio comprises a threaded shaft 27 (see FIG. 4) terminating in an adjusting hand wheel 28. Disposed intermediate the ends of the shaft 27 is a ball-like knuckle portion 29 engageable with a bearing socket 30 to provide a swivel for the adjustable shaft 27. The bearing socket 30 is disposed in a housing 31 which is fastened to the back wall 32 of the channel-shaped common support member 12 by means of bolts 33 (see FIG. 1).

The threaded shaft 27 of the adjusting means protrudes inwardly and through an elongated slot 34 of the motor bracket 18 and threadingly engages a pivot pin 35 suported at opposite ends by a suport member 36 affixed to the motor bracket 18 by means of welding, or stamping and forming of the bracket 18 (not shown) if so desired. C-washers 37 are arranged to be received in spaced grooves 38 of the pin 35 for preventing axial displacement thereof. It will thus be apparent that as the hand wheel 28 is rotated, the threaded portion of the shaft 27 thereof will engage the transverse threaded opening of the pivot pin 35 and cause the same to move the motor bracket 18 about its hinge pin 21 from the position A to the position B or intermediate positions therebetween. The spherical joint provided by the knuckle 29 and bearing 30 permits free operation between the shaft 27 and the pin 35 without requiring precise alignment between the motor mounting pad 18, the motor 11 and the hinge pin 20. This movement will tension the belt and cause the cones of the motor pulley 15 to separate, and thereby vary the drive ratio between the motor 11 and the reducer 10.

As stated previously, the reducer 10 preferably has a wide bearing span provided by an open frame construction permitting the use of a stiff mounting plate cooperating with the channel member 12 in the form of the peripherally extending flange portion 40. The flange 40 is preferably annular and includes a series of mounting bolts 41 circumferentially spaced from one another thereon. However, it is within the province of this invention to provide reducers of other configuration and which may be polygonal for purposes of selectively positioning the channel member 12 thereon. It will also be apparent that the housing of the motor 11 may be provided with a mounting flange (not shown) for providing a shiftable support for the member 12 if it is desired to reverse the arrangement without departing from the scope of this invention. Thus, it will be apparent from FIG. 1, that the common support or channel member 12 may be moved from the bold line position C to the interrupted or phantom line position D, or any other of the circumferential positions relative to the reducer by simply fastening the side wall of the channel to any of selected ones of the bolts 41. It will be observed from FIG. 3 that the channel 12 includes an inwardly extending portion of its lower side wall 42 for engagement with bolts 43 at the lower part of the reducer as viewed in FIG. 3. Thus, the arm or side wall 42 of the member 12 may be equipped with a series of circumferentially spaced openings for receiving the bolts 43 corresponding to the openings in the reducer housing for receiving bolts 41 to permit positioning of the support member 12 at any desired position relative to the reducer 10.

With reference to FIG. 3, the reducer 10 includes an open shaft supporting frame formed by a pair of spaced metal bearing carrying panel members 45 and 46. The construction embodies the wide bearing principles disclosed in Patent No. 2,950,628 granted to the present inventor and assigned to the present assignee. It will be noted that the panel member 45 is also arranged, as later described, to provide support for the reducer upon attachment of bolts 41 with the side wall of the channel member 12. The panel members 45 and 46 extend parallel to each other and are bolted or otherwise releaseably secured together, for example, by laterally disposed lugs (not shown) welded to the member 45, on the outer faces of which the member 46 is seated and secured by bolts (not shown). As previously stated, it is preferred that the panel members 45 and 46 be of circular form, the larger panel 45 being the main panel member and the panel 46 an auxiliary member.

Panel members 45 and 46 are provided with aligned bearings 47 and 48 for a shaft 49, and aligned bearings 91 and 92 (see FIG. 5) for the power input shaft 25. Panel 46 has a bearing 52 to receive the outer end of a power output shaft 53, which is preferably of hollow form to telescopically receive the projecting end of a removable shaft or gudgeon, such as an agitator blade shaft 54.

The present invention further contemplates an arrangement of reducer components permitting ease in removal and insertion of the gudgeon or shaft 54 from and into the hollow or quill shaft 53, and as shown in FIG. 3, a circular thrust plate 55 engages a shoulder 56 provided by an enlarged bore portion of the hollow shaft 53, and is maintained in place by means of a threaded Allen-head screw 57 engaging a tapped hole in the inner end on the gudgeon or shaft 54. Axial displacement of the thrust plate 55 is prevented by means of the snap ring 58 engaging an annular groove in the enlarged bore portion of the hollow shaft 53. An additional key 59 may be used for preventing relative rotation between the members 54 and 53. Thus, it will be seen that the shafts 54 may be easily removed from the hollow shaft 53 upon disengagement of the screw 57 therefrom. In fact, if the pulley 14 is spaced outwardly from the screw 57, it will not even be necessary to remove that pulley to remove the shaft 54 as the short end of an L-shaped Allen wrench may be inserted therebetween.

All of the shafts 49, 53 and 25 are disposed parallel to each other, the shafts 49 and 25 having their axes radially disposed relative to the axis of the shaft 53.

The shaft 49 has a gear 60 formed integrally thereon and disposed directly between the bearings 47 and 48, and providing shoulders 61 and 62 to receive the inner races of said bearings and a tapered outer end 63 carrying a gear 64 detachably fixed to it by a key 65 and a clamping nut 66, said gear 60 being immediately adjacent panel 45 and meshing with a larger gear 67 suitably mounted on the shaft 53 immediately adjacent the bearing 52. The shaft 25 is arranged to receive the drive element, such as the pulley 14 or the like and extends through bearings 91 and 92 seated in appropriate aligned openings in the plates 45 and 46, and is formed at its inner end for a keyed connection with a small gear or pinion 93 meshing with the gear 64.

An adapter in the form of a cup-like housing member 70, which may be cast as shown or fabricated of metal parts welded together, defines as an end wall thereof, a shaft supporting rear auxiliary panel portion 71, and an annularly flanged front pad 72 adapted to receive the bolts 41 by which the reduction unit may be secured to the channel support member 12 and arranged in fixed relation with the shaft 54 to be driven.

As shown in FIG. 3, shaft supporting panel portion 71 has an opening 75 and a bearing ring support 76 welded thereto with its inner surface 77 concentric with opening 75 and also concentric with an opening 78 in the panel 45 and a bearing receiving bore 79 in panel 46 so that by the insertion of a suitable mandrel through these bores, the panel portion 71 is aligned parallel to the panels 45 and 46. The bore 77 is adapted to receive the outer race of a bearing 80 whose inner race is mounted on the inner end of the hollow shaft 53. The margin of opening 78 is spaced from the outer diameter of the quill shaft 53.

A steel stamping forms a front cover 81 and is provided with a flanged opening 82 to receive a suitable ring oil seal 83, and the opening 75 has a similar seal 84 for the inner end of the shaft 53, the cover having a base flange 85 adapted to be clamped in position against the outer peripheral front face of the panel 45 by means of the bolts 41, there being sheet ring seals 86 and 87 interposed between the panel 45 and the flanges of the sections 70 and 81, thus forming an oil retainer reservoir which may be supplied with lubricating oil through any suitable opening, as for example, an opening 88 provided with a removable sealing plug 89.

With the above construction, power applied to the shaft 25 to rotate the same is transmitted by a small pinion gear 93 to the large gear 64 on shaft 49 and from the small gear 60 to the larger gear 67 on shaft 53 to provide the desired speed reduction between the shafts 25 and 53 and consequently the shaft 54 to be driven.

As the housing section or adapter 70 is fixed to a fixed support in the form of the common channeled support member 12 adjacent the shaft to be driven, and to the panel 45, it provides means for sustaining the gear carrying members as a unit against rotation about the shaft 54, and it also provides a support for the bearing 80 for the shaft 53 and thereby cooperates with the bearing 52 to provide an increased bearing span for the shaft 53 and therefore an increased capacity for this shaft to sustain the bearing loads imposed upon it by the gearing or external loads that may be imposed upon it by mechanism such as agitator paddles or blades driven thereby. Notice also that it cooperates with the panel 45 and the cover 81 to form an oil reservoir 90. The bearing span becomes of increased importance in the case of driving agitators which may be operated at angular deflection and oftentimes in relatively viscous admixtures.

Thus the present invention contemplates the very useful aspects of increased bearing span by the arrangement of the internal components of the reducer 10, along with the improved feature for fastening the gudgeon or shaft 54 to the hollow quill shaft 53 for ease in insertion and removal thereof. The novel arrangement of reducer components are also further combined with a facile construction for providing a variable drive ratio between the motor and the reducer which may be manually adjusted by means of the hand wheel 28 to rock the motor 11 on its hinge support members.

It is further to be noted that the arrangement of the present combination of elements is readily adaptable for use as a portable mixer drive unit as may be seen in FIG. 2, and in particular, for a counterbalanced arrangement. Here the combination motor and reducer mechanism is illustrated as being conveniently mounted on an L-shaped bracket 95 forming an additional support with the arm 42 of the channeled, common support member 12, and which bracket 95 may be provided with a plurality of openings to match the openings in the arm 42 for adjustable positioning of the unit relative thereto and about the periphery of the reducer as shown in FIG. 1. The bracket 95 is disposed intermediate the ends of the support member 12 so that the downwardly bent portion of the bracket 95 lies in a plane which transversely intersects the center of gravity of the combined assembly of support member 12 and the elements secured thereto. The downwardly formed portion of the L-shaped bracket 95 preferably terminates in the form of a wrap-around end portion 96 having its opposed sides serrated as shown at 97 for clamping engagement with an upstanding U-shaped bracket 98. A pintle pin or bolt 99 is arranged to pivotally support the bracket 95 relative to the bracket 98 and is threaded at an end thereof to receive a clamping nut 100 (see FIG. 1). Thus the entire unit may be rotated about the pintle pin 99 and clamped at the desired operating position by means of the nut 100 and the serrations 97 engageable with serrations (not shown) on the side arms of the bracket 98. In addition, the bracket 98 is arranged for swivel mounting relative to the bracket 101 by means of a mounting bolt and nut assembly 102 in clamping relationship with the members 98 and 101. The bracket 101 may be additionally provided with an intermediate wall portion 103 welded to the spaced arms of the bracket 101 for mounting on the rim of a reaction vessel 104 or the like. Clamping bolts 105 are arranged to engage tapped openings in the outer side wall of the bracket 101 for mounting engagement with the wall of the vessel 104.

It will thus be apparent that the present invention has provided a versatile combination of operating elements comprising the motor and speed reducer therefor, each being supported from a common support member and being further arranged for variable speed drive upon pivotal adjustment between the drive centers of the respective units to apply tension to a belt or the like for automatic adjustment of the spring biased cone type pulley. In addition, the present arrangement permits a balancing of components about the supporting bracket for use in counterbalancing weight of one unit with the other, which is especially beneficial when used as a portable operating unit.

I claim:

1. A variable speed drive assembly comprising in combination: a motor unit having a drive shaft; a reducer unit including a power input shaft and a power output shaft, gearing interconnecting said shafts, said output shaft arranged for operating connection with the drive shaft of a device to be driven thereby; the housing member of one of said units defining a marginal supporting flange having a uniform peripheral configuration; an elongated channel support member including pivot support means at one end thereof and having the opposite end thereof formed to provide a conforming contour shiftably mounted on the peripheral flange of the said housing member of the said one of said units a supporting pad for the other of said units and hingedly connected with said pivot support means and including a portion extending inwardly of said unit and defining a threaded opening in said portion; drive ratio adjusting means comprising a rotatable shaft supported by and disposed intermediate said ends of said support member and having a threaded portion extending inwardly of the said member, manual operating means for rotating said shaft, and means for preventing endwise movement of the shaft relative to the channel member; the threaded opening of said support pad portion being arranged for threading engagement with the inwardly extending threaded portion of said shaft; a reducer pulley affixed to said reducer input shaft, a motor pulley affixed to said motor drive shaft and a belt operatively connecting said pulleys, one of said pulleys comprising pulley cones arranged for relative opposed movement and biasing means normally urging the cones towards one another, whereby manual rotation of said adjusting shaft will be reflected through said drive ratio adjusting means to the said other unit to rock the said other unit on its hinged connected to change the center distance between said pulleys and thereby vary the drive ratio between the motor and reducer units.

2. The drive assembly of claim 1 including in combination therewith a supporting angle bracket comprising intersecting arms one of which is disposed intermediate said ends of and in supporting engagement with said elongated channel support member, the other intersecting arm being disposed in a plane transversely intersecting the center of gravity of the combined assembly.

3. A variable speed drive assembly comprising in combination: a motor unit having a drive shaft; a mounting pad for said motor; a reducer unit including a power input shaft and a power output shaft, gearing interconnecting said shafts, a cup-like reducer housing member defining a marginal supporting flange having a uniform peripheral configuration, the central axis of said flange being spaced from the axis of said input shaft, said output shaft having a hollow axial bore for removably receiving the drive shaft of a device to be driven thereby, means for removably affixing said hollow output shaft to the end of said removable drive shaft; an elongated channel support member including pivot support means at one end thereof hingedly connected with said motor mounting pad and having side walls formed at the opposite end thereof to provide a conforming contour shiftably mounted on the supporting flange of the cup-like reducer housing member, said motor mounting pad having a portion extending inwardly of said motor and defining a threaded opening therein; drive ratio adjusting means comprising a rotatable shaft supported by and disposed intermediate said ends of said channel member and having a threaded portion extending inwardly of the said member and engageable with the threaded opening in said motor mounting pad portion, manual operating means for rotating said shaft, and means for preventing endwise movement of the shaft relative to the channel member; a reducer pulley affixed to said reducer input shaft, a motor pulley affixed to said motor drive shaft and a belt operatively connecting said pulleys, one of said pulleys comprising pulley cones arranged for relative opposed movement and biasing means normally urging said cones toward one another, whereby manual rotation of said adjusting shaft will be reflected through said drive ratio adjusting means of said motor mounting pad to rock the pad on its hinged connection to change the center distance between said pulleys and thereby vary the drive ratio between the motor and reducer units.

4. A variable speed drive assembly comprising in combination: a motor unit having a drive shaft; a mounting pad for said motor unit; a reducer unit of an open frame construction comprising three laterally spaced rigidly interconnected shaft supporting panel members including a main panel member and first and second auxiliary panel members spaced at opposite sides thereof, a power input shaft and a power output shaft journalled in said frame construction, gearing interconnecting said shafts, said second auxiliary panel member defining the end wall of a cup-like reducer housing member, said cup-like member defining an arcuate marginal supporting flange, the axis of said flange being eccentric relative to the axis of said power input shaft, said output shaft extending through said second auxiliary panel member and having a hollow axial bore for removably receiving the drive shaft of a device to be driven thereby, a thrust plate arranged to be received in the said bore and to be restricted from axial movement therein, means for removably attaching said thrust plate to the end of said removable drive shaft, the main panel member of said reducer including an aperture having its defining margin spaced from said output shaft, and bearings for said output shaft axially spaced from one another and respectively supported by said first and second auxiliary panel members; an elongated channel support member including pivot support means at one end thereof hingedly connected with said motor mounting pad and having side walls formed at the opposite end thereof to provide a conforming arcuate contour shiftably mounted on the arcuate flange of the cup-like reducer housing member, said motor mounting pad having a portion extending inwardly of said motor and defining a threaded opening therein; drive ratio adjusting means comprising a rotatable shaft supported by and disposed intermediate the ends of said channel member and having a threaded portion extending inwardly of the said member and engageable with the threaded opening in said motor mounting pad portion, manual operating means for rotating said shaft, and means for preventing endwise movement of the shaft relative to the channel member; a reducer pulley affixed to said reducer input shaft, a motor pulley affixed to said motor drive shaft and a belt operatively connecting said pulleys, one of said pulleys comprising pulley cones arranged for relative opposed movement and biasing means normally urging the cones towards one another, whereby manual rotation of said adjusting shaft will be reflected through the engagement of said thread adjusting shaft and said threaded opening in the portion of said motor mounting pad to rock the pad on its hinged connection to change the center distance between said pulleys and thereby vary the drive ratio between the motor and reducer units.

References Cited in the file of this patent
UNITED STATES PATENTS

| | | |
|---|---|---|
| 1,197,386 | Morse | Sept. 5, 1916 |
| 2,488,871 | Locke | Nov. 22, 1949 |
| 2,544,812 | Thompson | Mar. 13, 1951 |
| 2,640,367 | Rieser | June 2, 1953 |
| 2,894,406 | Rampe | July 14, 1959 |
| 2,950,628 | Bade | Aug. 30, 1960 |